Sept. 22, 1953 E. M. WILLIAMS ET AL 2,653,222
RADIO JAMMING DEVICE
Filed Aug. 4, 1944
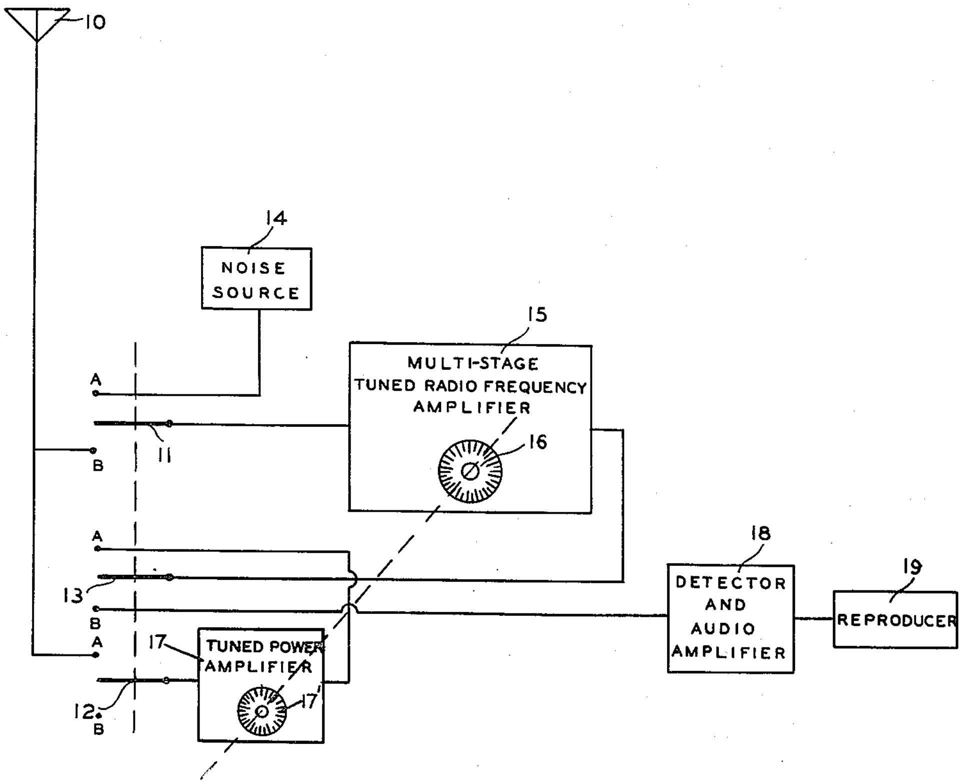
INVENTOR.
EVERARD M. WILLIAMS
EDWIN V. COUSY
BY William D. Hall
ATTORNEY Patented Sept. 22, 1953 2,653,222

UNITED STATES PATENT OFFICE 2,653,222

RADIO JAMMING DEVICE

Everard M. Williams and Edwin V. Cousy, Dayton, Ohio

Application August 4, 1944, Serial No. 548,130

1 Claim. (Cl. 250—13)

(Granted under Title 35, U. S. Code (1952), sec. 266)

The invention described herein may be manufactured and used by or for the Government for governmental purposes, without the payment to us of any royalty thereon.

This invention relates to radio systems in general and more particularly to those systems and devices used to jam high frequency radio transmission so that such transmission will be rendered unintelligible.

Heretofore, systems of this type have been extremely bulky and generally unsatisfactory for airborne use in view of the fact that the search receiver and the jamming transmitter were made up of two separate and distinct units with no thought of combining the two.

It is an object of our invention to provide a device and system for interfering with radio transmission.

It is a further object of our invention to provide a device that will cause jamming and interference with radio transmission within a wide band of the very high frequency spectrum.

It is another object of our invention to provide a combined search receiver and jamming transmitter that is simple in construction and operation, efficient, and light in weight so that it may be carried in an aircraft or other vehicle where weight and space are at a premium.

It will still another object of our invention to provide a combined search receiver and jamming transmitter, each of which may operate independently of the other while using some components in common.

It is also another object of our invention to provide a manually tuned search receiver and a noise jammer for locating and jamming victim signals.

These and other objects are obtained by the novel structure and arrangement hereinafter described and illustrated in the accompanying drawing which is a block diagram of our device.

In general, our device includes a unitary tuned amplifier utilized for both the receiving and transmitting circuits, there being means to selectively connect the tuned amplifier into either the transmitting circuit or the receiving circuit, as may be desired. There is also provision for rendering the receiving circuit inoperative while the transmitting circuit is operative, and vice versa. Since the same antenna is utilized for receiving and transmitting, further simplification is effected.

Referring to the block diagram of our device, as illustrated in the accompanying drawing, it is seen that reference numeral 10 indicates an antenna that is connected to contact B of switch 11 and to contact A of switch 12. Switches 11, 12 and 13 are ganged together to utilize the antenna 10 in both the receiving and transmitting circuits.

The components of our transmitting circuit include a noise generator or source 14, a multistage tuned radio frequency amplifier 15 having a single manual tuning control 16, and a tuned power amplifier 17 having a single tuning control 17' that is ganged to the tuning control 16 of the tuned radio frequency amplifier 15. The noise generator or source 14 is connected to contact A of switch 11, the multistage tuned radio frequency amplifier 15 is connected in series to the blades of switches 11 and 13, while the power amplifier 17 is connected to the blade of switch 12.

The receiving circuit of our system includes the antenna 10, the multi-stage tuned radio frequency amplifier 15, detector and audio amplifier stage 18, and reproducer 19. The detector and audio amplifier stage 18 is connected to contact B of switch 13.

With the ganged switches 11, 12 and 13 thrown to positions B, the receiving circuit is established and the transmitting circuit is rendered inoperative. With the ganged switches 11, 12 and 13 thrown to positions A, the transmitting circuit is established and the receiving circuit is rendered inoperative. Thus it is seen that the multiple stage tuned radio frequency amplifier 15 is included in both the receiving and transmitter circuits. The noise source or generator 14 may be any circuit known to the art for producing a band of radio frequencies covering the entire tuning range of the amplifier 15. Such a circuit, for example, may include the tube type 931A as a random noise generator. The power amplifier 17 may be a single tube power amplifier including, for example, the tube type 807 in a conventional power amplifier circuit to amplify the generated noise to a level suitable for jamming purposes. The reproducer 19 may be a loudspeaker, headphones, oscilloscope, or combination of any of these three.

The multi-stage tuned radio frequency amplifier 15 is of the ganged variable-core inductance type which will permit single control tuning of the amplifier stages. Such a tuner may be of the type described and claimed in the copending U. S. patent application of Charles J. Victoreen on a "Variable Inductive Tuner" filed January 8, 1944, Serial Number 517,517 now U. S. Patent Number 2,439,403.

In the operation of our device, the operator throws the ganged switches 11, 12, and 13 to the B or the "receiving" positions, and adjusts the control 16 to tune the multi-stage tuned radio frequency amplifier 15 to locate any signals it is desired to jam. Tuning the amplifier stages to "peak" any desired signal or group of signals in the reproducer 19 places the equipment on the proper jamming frequency and the operator need only throw the switches 11, 12 and 13 from the "receiving" positions to the A or the "transmitting" positions in order to place the jamming transmitter into operation on the desired frequency.

Thus it is seen that we have devised a system and device which is both compact, light, and simple of operation.

The above description is to be considered as illustrative of the invention in which modifications can be made without departing from the scope of the invention.

Having thus described our invention, we claim:

In a radio jamming system, a network having a detector, an audio-frequency amplifier coupled to said detector and a reproducer coupled to said audio-frequency amplifier, a tuned power amplifier, a multi-stage tuned radio frequency amplifier, means interconnecting said radio frequency amplifier and said power amplifier for tuning said amplifiers in unison, a radio frequency noise generator, antenna means, and a ganged three pole, two position switch; the first pole having the movable contact connected to the input of the multi-stage tuned radio frequency amplifier, said noise generator connected to one stationary contact and said antenna means connected to the other stationary contact, the second pole having the movable contact coupled to the output of the multi-stage tuned radio frequency amplifier, one stationary contact connected to the output of said tuned power amplifier and the other stationary contact connected to said network, the third pole having the movable contact connected to the input of the tuned power amplifier, a sationary contact coupled to said antenna means, where in one switch position the antenna, multi-stage radio frequency amplifier, detector, audio amplifier and reproducer are connected, in the order named, for radio frequency signal reception; and in the other switch position the noise generator, multi-stage radio frequency amplifier, tuned power amplifier and antenna are connected, in the order named, for radio frequency noise transmission.

EVERARD M. WILLIAMS.
EDWIN V. COUSY.

References Cited in the file of this patent

UNITED STATES PATENTS

| Number | Name | Date |
|---|---|---|
| 2,098,956 | Dudley | Nov. 16, 1937 |
| 2,317,547 | McRae | Apr. 27, 1943 |
| 2,327,248 | Case | Aug. 17, 1943 |
| 2,363,583 | Gilman | Nov. 28, 1944 |
| 2,366,329 | George | Jan. 2, 1945 |
| 2,402,606 | Davis | June 25, 1946 |
| 2,416,307 | Grieg | Feb. 25, 1947 |
| 2,419,593 | Robinson | Apr. 29, 1947 |
| 2,439,408 | Mitchell | Apr. 13, 1948 |
| 2,447,490 | Collins | Aug. 24, 1948 |
| 2,452,601 | Ranger | Nov. 2, 1948 |